(12) United States Patent
Kenington

(10) Patent No.: US 8,761,700 B2
(45) Date of Patent: Jun. 24, 2014

(54) ACTIVE ANTENNA ARRAY WITH A SINGLE COMMON CLOCK AND A METHOD FOR RELAYING A PLURALITY OF RADIO SIGNALS

(71) Applicant: Peter Kenington, Chepstow (GB)

(72) Inventor: Peter Kenington, Chepstow (GB)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 13/910,570

(22) Filed: Jun. 5, 2013

(65) Prior Publication Data

US 2013/0267165 A1  Oct. 10, 2013

Related U.S. Application Data

(63) Continuation of application No. 12/650,021, filed on Dec. 30, 2009, now abandoned.

(51) Int. Cl.
*H04M 1/00* (2006.01)
(52) U.S. Cl.
USPC ......... 455/146; 455/131; 455/552.1; 455/147
(58) Field of Classification Search
CPC .......................................................... H04B 1/14
USPC ............................. 455/129, 562.1, 232.1, 121
See application file for complete search history.

(56) References Cited

U.S. PATENT DOCUMENTS

| | | | |
|---|---|---|---|
| 5,794,159 A * | 8/1998 | Portin | 455/553.1 |
| 5,835,853 A * | 11/1998 | Enoki et al. | 455/180.1 |
| 6,029,052 A * | 2/2000 | Isberg et al. | 455/131 |
| 6,081,691 A * | 6/2000 | Renard et al. | 455/12.1 |
| 6,360,087 B1 * | 3/2002 | Rozenblit et al. | 455/255 |

(Continued)

FOREIGN PATENT DOCUMENTS

| | | |
|---|---|---|
| CN | 1469559 | 1/2004 |
| KR | 20080043577 | 5/2008 |
| WO | 2006/053158 | 5/2006 |

OTHER PUBLICATIONS

International Preliminary Report issued in PCT/EP10/70113 on Jul. 12, 2012.

(Continued)

*Primary Examiner* — Tilahun B Gesesse
(74) *Attorney, Agent, or Firm* — Stephen H. Eland; Dann, Dorfman, Herrell & Skillman

(57) ABSTRACT

An active antenna system for a mobile communications network and a method for relaying radio signal in the mobile communications network is disclosed. The active antenna system comprises a plurality of antenna elements for relaying radio signals at a first frequency band. The antenna elements are connected to a plurality of signal paths. A plurality of signal inputs for inputting radio signals at a second frequency band is connected to the plurality of signal paths. A plurality of mixers in the signal paths converts the frequency of the radio signals between the first frequency band and the second frequency band. A plurality of local oscillators is connected to the mixers and a single reference oscillator can be connected through a plurality of first dispersion elements to different ones of the plurality of local oscillators through a plurality of first oscillator signal paths and to a digital signal processor.

19 Claims, 3 Drawing Sheets

(56) References Cited

U.S. PATENT DOCUMENTS

| | | | |
|---|---|---|---|
| 6,606,485 B1* | 8/2003 | Chen et al. | 455/140 |
| 6,766,178 B1* | 7/2004 | Damgaard et al. | 455/552.1 |
| 7,224,952 B2* | 5/2007 | Boecker et al. | 455/260 |
| 7,260,416 B2* | 8/2007 | Shippee | 455/552.1 |
| 8,306,154 B2* | 11/2012 | Ruegamer et al. | 375/316 |
| 8,660,104 B2* | 2/2014 | Rofougaran | 370/339 |
| 2003/0032424 A1 | 2/2003 | Judd et al. | |
| 2003/0232604 A1* | 12/2003 | Mocquard et al. | 455/92 |

OTHER PUBLICATIONS

International Search Report issued in PCT/EP10/70113 on May 9, 2011.

Official Action issued in CN Appl. No. 201080060382.7 on Dec. 23, 2013.

English Summary of Official Action issued in CN Appl. No. 201080060382.7 on Dec. 23, 2013.

* cited by examiner

ACTIVE ANTENNA ARRAY WITH A SINGLE COMMON CLOCK AND A METHOD FOR RELAYING A PLURALITY OF RADIO SIGNALS

CROSS-REFERENCE AND RELATED APPLICATIONS

This application is a continuation application of U.S. patent application Ser. No. 12/650,021 filed on Dec. 30, 2009. This application is also related to U.S. patent application Ser. No. 12/650,025 entitled "Active Antenna System For A Mobile Communications Network As Well As A Method For Relaying A Plurality Of Radio Signals Through The Active Antenna System" filed Dec. 30, 2009. The entire contents of each of the foregoing applications are incorporated herein by reference.

FIELD OF THE INVENTION

The field of the invention relates to an active antenna array for a mobile communications network as well as a method for relaying a plurality of radio signals through the active antenna array.

BACKGROUND OF THE INVENTION

In a typical base station of the prior art, local oscillator signals are provided for each one of the transceivers in the base station. Likewise, in a remote radio head application, individual local oscillator signals are also provided individually for each one of the transceivers located in the remote radio head application. It is necessary to provide multiple numbers of individual local oscillator signals, since each one of the transceivers may be operating on different channels. Multiple local oscillators may also be included to improve reliability through the removal of the single point of failure which a single local oscillator would provide.

One issue associated with the approach of utilizing a multiple number of individual local oscillators is the expense and real estate on a chip associated with providing the plurality of local oscillators and the possible need to calibrate the different ones of the oscillators. This can be an issue during a start-up phase. For example, if the individual local oscillators are not correctly calibrated at the start-up, this may lead to difficulties in ensuring that the required beam forming operations for the radio signals are undertaken correctly. In particular, this may mean that the correct beam shapes for the radio signal in the required directions are not correctly calculated.

FIG. 1 shows an example of an active antenna array as known in the prior art and comprising a plurality of transmission paths. Only a first signal path at the top, a second signal path in the middle and a last or n'th signal path at the bottom are illustrated in FIG. 1 (as well as in the subsequent figures). The third to the (n−1)th transmission paths are not illustrated for the sake of clarity.

A radio signal in the digital domain to be transmitted reaches the active antenna array from the left and is fed to the digital signal processor 15. The digital signal processor 15 distributes the radio signals to be transmitted to a plurality of output paths 16a, 16b, . . . , 16n. In the prior art example illustrated the radio signals to be transmitted by the plurality of output paths 16a, 16b, . . . , 16n are digital IF transmission signals which have undergone upconversion in the digital signal processor 15. Other processes may also take place in the digital signal processor 15 and these include, but are not limited to: crest factor reduction, digital predistortion and digital beamforming. The inclusion or omission of these processes has no impact on the teachings of the disclosure as described herein. For simplicity the letters relating to all of the paths will be left out in future reference numerals.

Only the passage of the transmission signal through the top one of the output paths 16a will be described in detail. It will be appreciated that all of the other output paths 16b, . . . , 16n are identical. The output path 16a is connected to a digital-to-analogue converter 20a which converts the digital IF transmission signals from the digital signal processor 15 to analogue signals prior to passing the analogue signals through a first filter 25a to obtain those filtered transmission signals in the desired frequency band. The filtered transmission signals in the desired frequency band are forwarded to a first mixer 30a. The first mixer 30a upconverts the filtered transmission signals by means of a first oscillator 35a to an analogue intermediate frequency band. The first oscillator 35a is clocked by a signal from a first reference clock 100a.

The output of the first mixer 30a is filtered in a second filter 40a and passed to an intermediate frequency amplifier 45a. The output of the intermediate frequency amplifier 45a is passed to a second mixer 50a at which it is upconverted with an oscillator signal from the second local oscillator 55a. The second local oscillator 55a is also clocked from the first reference clock 100a.

The transmission signals from the first mixer 50a are now at a transmission frequency band (the radio frequency) and are passed through a third filter 60a into a radio frequency amplifier 65a before entering a transmission filter 70a and being passed to the radio frequency output 80a. The radio frequency output 80a is connected to one of the plurality of antenna elements from the antenna array (not shown). A tap 75a provides a feedback loop to the digital signal processor 15 through paths 85 which allow calibration and updating of the predistortion processing, of the radio signals to be taken into account.

SUMMARY OF THE INVENTION

An active antenna array for a mobile communications network is disclosed herein. The active antenna array comprises a plurality of antenna elements for relaying radio signals at a first frequency band. The plurality of antenna elements is connected to a plurality of signal paths. The active antenna signal system has a plurality of signal inputs which are connected to the plurality of signal paths. A plurality of first mixers is present in the plurality of the signal paths which convert the frequencies of the radio signals between the first frequency band and a second frequency band. A plurality of first local oscillators are connected to the plurality of first mixers and a single reference clock is connected to different ones of the plurality of first local oscillators through a plurality of first oscillator signal paths and also to a digital signal processor.

The term "relaying" or "relay" in this description is intended to encompass both the transmission of radio signals and the reception of radio signals.

It will be further appreciated that the single reference clock may not be directly connected to the digital signal processor. There may be a separate clock generator for the digital signal processor which is connected to the single reference clock.

The use of a single reference clock enables the plurality of first local oscillators to be accurately calibrated with each other, since there is only a single reference clock. This allows additionally real estate to be saved on the chip.

The active antenna array may also comprise a plurality of second mixers which are connected to the output of the plurality of first mixers and which convert the frequency of the radio signals between the second frequency band, for example an intermediate frequency, and a third frequency band, for example the radio frequency. The plurality of second mixers is connected to a plurality of second oscillators which are clocked by the single reference clock through a plurality of second oscillator signal paths. It will be appreciated that the output of the first mixers is not (necessarily) connected to the input of the second mixers. There may—and generally will—be additional elements, such as filters and/or amplifiers, present between the outputs and inputs In one aspect of the invention, dispersion elements are included in the first oscillator signal paths or the second oscillator signal paths which allow the delay and/or phase of the clock signal to the plurality of the first local oscillators and/or the second local oscillators to be changed to take into account delays of the radio signals along the signal paths or of the local oscillator signals along the first local oscillator signal path and the second local oscillator signal path.

A method for relaying of a plurality of radio signals is also disclosed. This method comprises inputting a plurality of radio signals at a first frequency band, for example a base band, generating a plurality of first oscillator signals from a single reference clock signal, generating a DSP clocking signal from the single reference clock signal and converting the plurality of the radio signals from the first frequency band to a second frequency band using the plurality of first local oscillator signals.

It will be appreciated that the first local oscillator signals and DSP clocking signal may be generated either directly or indirectly from the single reference clock signal.

The method may also include adjusting the dispersion of at least one of the plurality of first oscillator signals.

The method may also comprise generating a plurality of second local oscillator signals from the signal reference clock signal and converting the plurality of radio signals from the second frequency band to a third frequency band, for example the radio frequency, using the plurality of second local oscillator signals. In one aspect of the invention one or of the plurality of second local oscillator signals can be adjusted using dispersion elements.

A chip set for use in the antenna system is also disclosed. The chip set comprises a plurality of signal inputs for inputting the radio signals at a second frequency band and being connected to the plurality of signal paths. The chip set further comprises a plurality of first mixers in the plurality of the signal paths for converting the frequency of the radio signals between the first frequency band and the second frequency band. A plurality of first local oscillators is connected to the plurality of first mixers and a single reference clock is connected to different ones of the plurality of first local oscillators and to a digital signal processor.

A computer program provides comprising a computer-useable medium having control logic stored in the computer-useable medium is also disclosed. The control logic is able to code a computer and associated manufacturing apparatus to manufacture an active antenna array for the mobile communications network. The active antenna array comprises a plurality of antenna elements for relaying radio signals at a first frequency band, wherein the plurality of antenna elements are connected to a plurality of signal paths. A plurality of signal inputs for inputting the radio signals at a second frequency band is also connected to the plurality of signal paths. The active antenna array further includes a plurality of first mixers in the plurality of the signal paths for converting the frequency of the radio signals between the first frequency band and the second frequency band. A plurality of first local oscillators is connected to the first mixers and a single reference clock is connected to the plurality of first local oscillators and to a digital signal processor.

A computer program product comprising a computer-useable medium having control logic for causing an active antenna to execute a method for relaying a plurality of individual radio signals is also disclosed. The computer program product has first computer readable code means for inputting a plurality of radio signals at a first frequency band and second computer readable code means for generating a plurality of first oscillator signals from a single reference clock signal. The computer program product further comprises third computer readable code means for converting the plurality of radio signals from a first frequency band to a second frequency band using the plurality of first local oscillator signals.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect can be combined with a feature of a different aspect or aspects.

Figure 1:
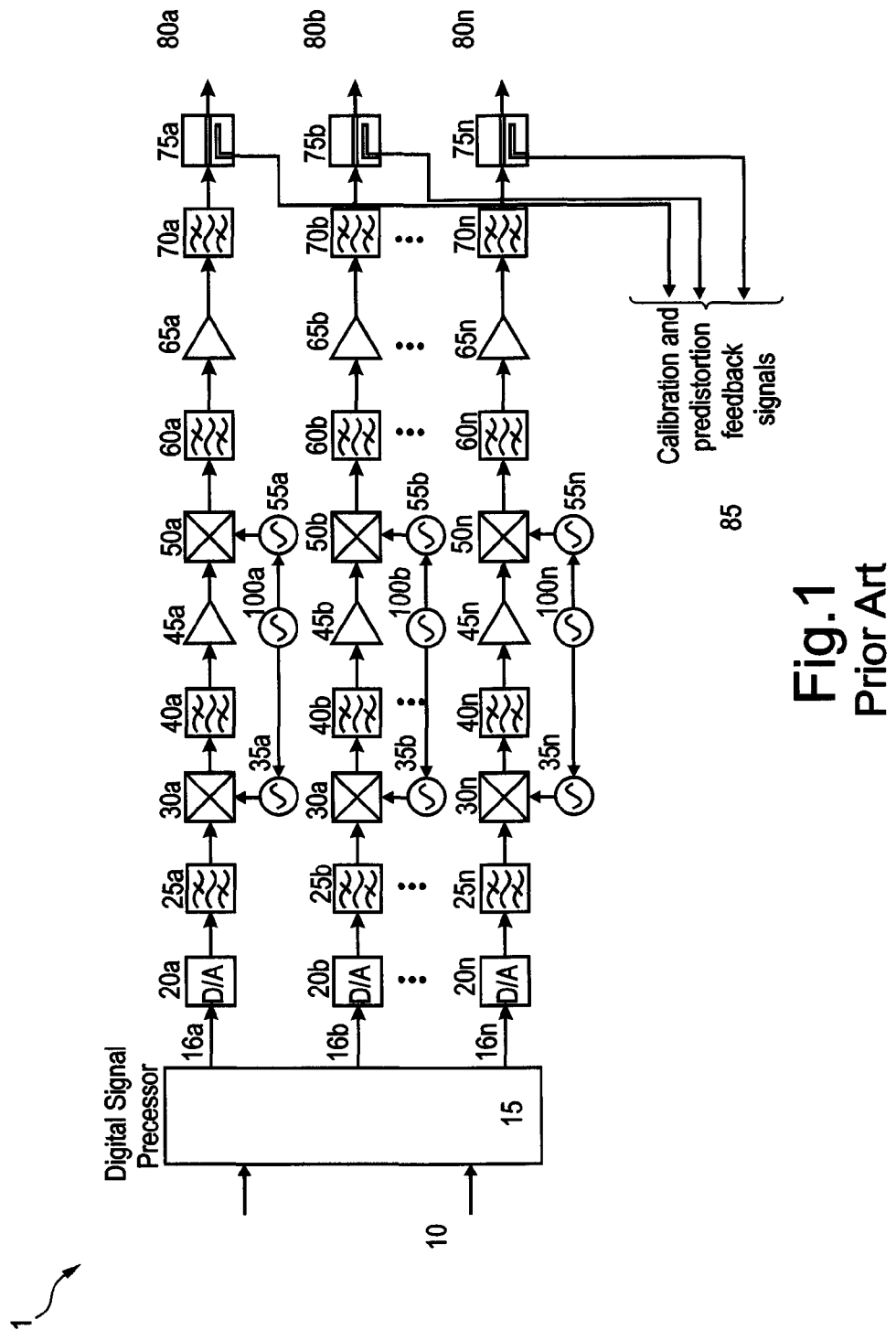
FIG. 1 shows a prior art method for an antenna system for mobile communications network.
Figure 2:
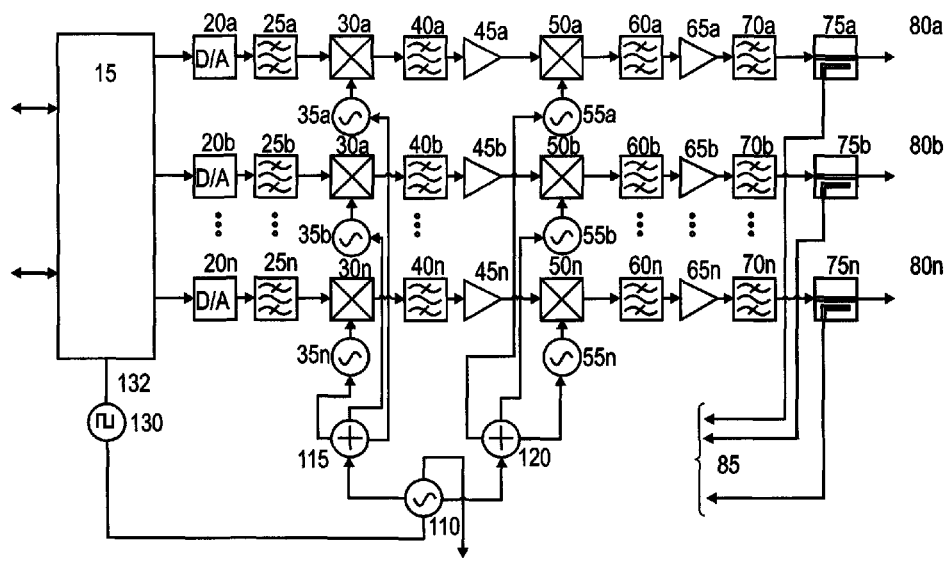
FIG. 2 shows an active antenna system employing a common clock for all of the local oscillators and also for the digital signal processing apparatus.

FIG. 2 shows a first aspect of the invention. It would be appreciated that many of the elements in FIG. 2 are identical with the elements in FIG. 1 and have been allocated the same reference numerals. This disclosure outlines in detail aspects of the disclosure relating to the transmission of radio signals. Modifications of the circuit required for the reception of radio signals will be disclosed later.

The aspect of the invention shown in FIG. 2 differs from the prior art method in FIG. 1 in that the first oscillators 35 and the second local oscillators 55 are not connected to a plurality of reference clocks 100, but to a single reference clock 110 through a first combiner 115 and/or a second combiner 120. This has the advantage that a single reference clock 110 is used in the active antenna array 1, rather than a plurality of local reference clocks 100a, 100b, ..., 100n for each one of the signal paths 16 used in the prior art active antenna array as shown in FIG. 1. As noted above three signal paths are shown. The disclosure is equally applicable to more than three signal paths.

It will be noted that the single reference clock 110 also supplies a clock signal 128 to a digital clock generator 130 which is used to generate a DSP clocking signal 132 for the digital signal processor 15. It should be noted that the frequency of the DSP clocking signal 132 which supplies the digital signal processor 15 is not constrained to be the same as the frequency of the single reference clock 110. It will be appreciated, by those skilled in the art, that the generation of a very wide range of digital clock frequencies is possible, based upon a frequency of the single reference clock 115, and that a frequency appropriate to the needs of the digital signal processor 15 can easily be derived, either directly or indirectly, from the frequency of the reference clock 115.

Figure 3:
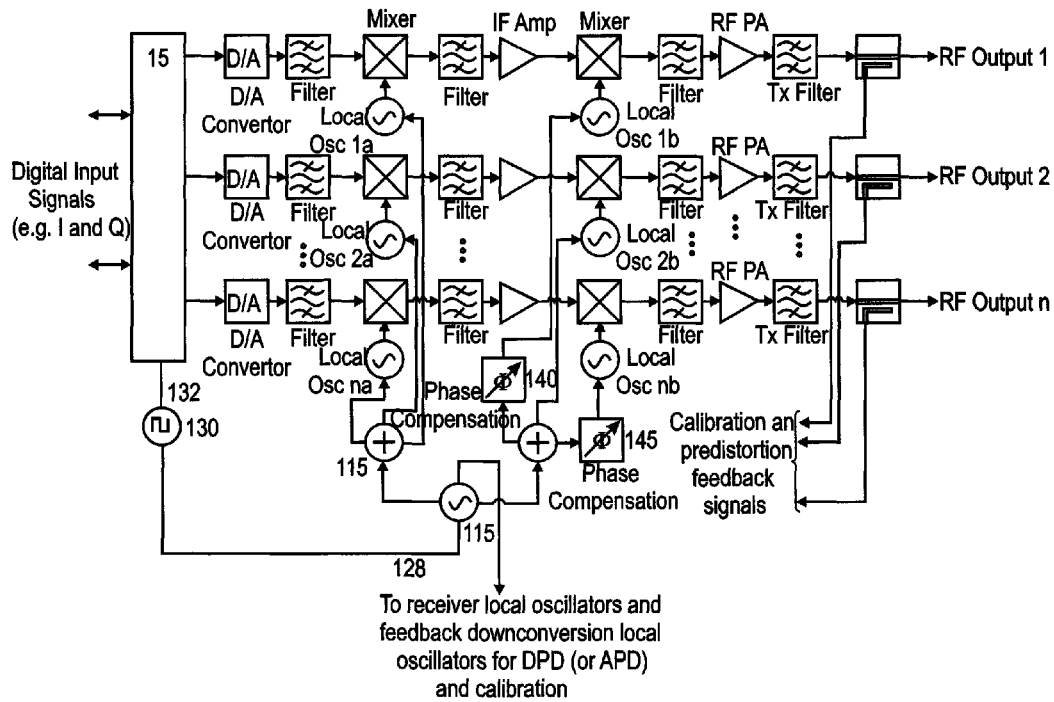
FIG. 3 shows an active antenna system employing a common clock with phase compensation.

FIG. 3 shows a second aspect of the invention in which dispersion elements 140 and 145 are connected between the second combiner 120 and the plurality of second local oscillators 55. The dispersion elements 140 and 145 are shown here as phase shifters but could also be implemented as delay elements. The function of the dispersion elements 140 and 145 is to take into account that the length of the paths of the transmission signals through the complete transmission signal paths or the lengths of the local oscillator signal paths (i.e. between the single reference clock 110 and the second local oscillators 55) may vary slightly between different ones of the transmission signal paths. The dispersion elements 140 and 145 can therefore slightly change the time of arrival of the clock signal supplied to the second local oscillators 55 in order to take this change of path length into account. It will also be appreciated that it is possible to do without one of the dispersion elements in the path supplying the clock signal to one of the second local oscillators 55.

The dispersion elements 140 and 145 are shown here as only being connected between the second combiner 120 and the plurality of second local oscillators 55. It is possible to also add further dispersion elements between the first combiner 115 and the plurality of first local oscillators 35. It is also possible to have digital dispersion elements at the digital signal processor 15 to provide any necessary correction the digital signals on the signal path 16.

Figure 4:
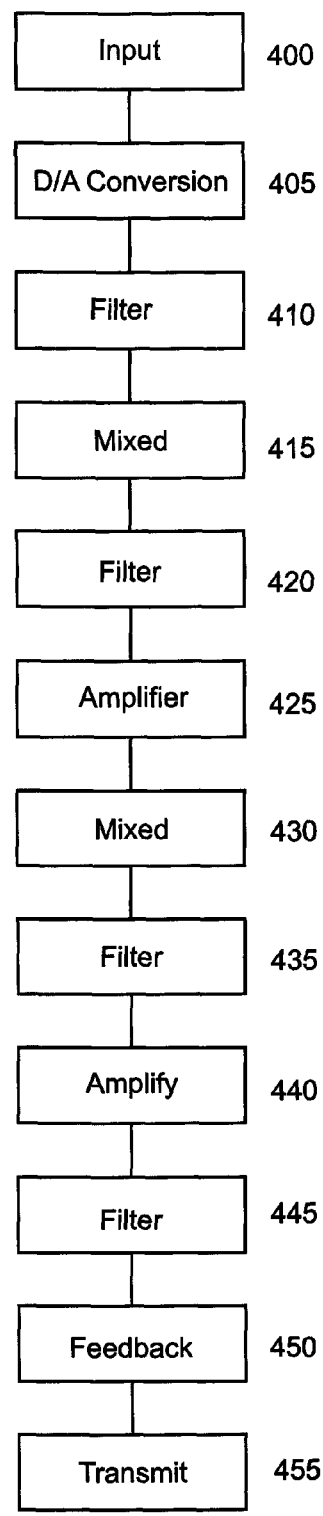
FIG. 4 shows an overview of a method for relaying a plurality of radio signals employing the common clocks.

FIG. 4 shows a method for transmitting the plurality of radio signals according to the disclosure. In FIG. 4 in step 400 the digital transmission signals are input into the digital signal processor 15 where beam forming operations are carried out on the transmission signals. The manipulated digital signals are output over the signal paths 16 to the digital to analogue convertor 20 in step 405 at which point the manipulated digital signals are converted to analogue signals and in step 410 the analogue signals are filtered to remove out-of-band frequencies. In step 415 the analogue radio signals from the first filter 25 are modulated with a first local oscillator signal supplied by the first local oscillator 35 which is clocked by the single reference clock 110. This generates analogue signals at an intermediate frequency. The individual radio signals at the intermediate frequency band are filtered in the second filter 40 to remove out-of-band signals and then amplified in an intermediate frequency amplifier 45 before being passed to a second mixer 50, where they are upconverted with a second oscillator signal in step 430 to the transmission frequency. The second mixer 55 receives the second oscillator signal from the second oscillator 55 which, as noted above, is fed by the single reference clock 110.

In step 435 out-of-band frequencies from the individual radio signals from the second mixer 55 are filtered in the third filter 60 before the individual radio signals at the radio frequency are amplified once again in the second amplifier 65 in step 440. In step 445 out-of-band frequencies are filtered out of the individual radio signals in the fourth filter 70. A feedback signal is generated in step 450 which is supplied to calibration and pre-distortion feedback elements. Finally in step 455 the individual radio signals are transmitted through individual ones of the antenna array elements.

The active antenna array of the current disclosure has been described with respect to the transmission of radio signals from the base station. It will, however, be appreciated that the provision of the single reference clock 110 in the active antenna array can also be used for the receipt of individual radio signals through the plurality of antenna array elements and their down conversion to the base band frequency.

In this receive case, the first local oscillators 35, the second local oscillator 55, the first mixers 30 and the second mixers 50 are used to downconvert the plurality of receive signals incident upon the antenna elements 80*a* and the plurality of receive signal paths will ultimately supply a plurality of digital IF signals to the digital signal processor 15 (or to a separate receive digital signal processor, not shown). The same reference clock 110 is used to supply both the transmit and receive ones of the first local oscillators 35 and the second local oscillators 55, and also to supply the receive DSP, in the event that this is a separate chip or subsystem to that used for the transmit portion of the active antenna array. The transmit and receive ones of the first local oscillators 35 and the second local oscillators 55, may, however, operate on different frequencies from one another, for example where a frequency split occurs between the transmit and receive bands in a duplex system. The dispersion elements 140 and 145 may also be used in the plurality of receive paths or the plurality of local oscillator paths (or both) in the same manner and for the same purpose as was described above for the transmit aspects of the invention.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna array for a mobile communications network comprising:
   a plurality of antenna elements (Ant-1, Ant-2, ..., Ant-N) for relaying radio signals at a first frequency band, the plurality of antenna elements (Ant-1, Ant-2, ..., Ant-N) being connected to a plurality of signal paths;
   a plurality of signal inputs for inputting radio signals at a third frequency band and being connected to the plurality of signal paths;
   a plurality of first mixers in the plurality of the signal paths for converting the frequency of the radio signals between the first frequency band and a second frequency band,
   a plurality of second mixers connected to outputs of the plurality of first mixers in the plurality of signal paths and for converting the frequency of the radio signals between the second frequency band and the third frequency band;
   a plurality of first local oscillators connected to the plurality of first mixers; and
   a plurality of second local oscillators being connected to different ones of the plurality of second mixers; and
   a single reference oscillator being connected to different ones of the plurality of first local oscillators through a plurality of first oscillator signal paths, to different ones of the plurality of second local oscillators through a plurality of second oscillator signal paths, and to a digital signal processor.

2. The active antenna array of claim 1, wherein the single reference oscillator is connected to the different ones of the plurality of first local oscillators through a plurality of first dispersion elements.

3. The active antenna array of claim 2, wherein the first dispersion elements are at least one of a delay element or a phase compensation element.

4. The active antenna array of claim 2, wherein a setting of the plurality of first dispersion elements is related to a length of the one of the plurality of first oscillator signal paths through which the first dispersion element is connected to the single reference oscillator.

5. The active antenna array of claim 1, wherein the single reference oscillator is connected to the different ones of the plurality of second oscillators through a plurality of second dispersion elements.

6. The active antenna array of claim 5, wherein a setting of the plurality of second dispersion elements is related to a length of the one of the plurality of second oscillator signal paths through which the second dispersion element is connected to the single reference oscillator.

7. The active antenna array of claim 1, wherein the digital signal processor is connected to the plurality of signal inputs.

8. The active antenna array of claim 1, wherein the second dispersion elements are at least one of a delay element or a phase compensation element.

9. The active antenna array of claim 1, further comprising at least one feedback path connected between an output of one of the plurality of signal paths and a calibration device.

10. The active antenna array of claim 9, further comprising a switching device in the at least one feedback path.

11. A method for relaying a plurality of radio signals comprising:
    inputting a plurality of radio signals at a first frequency band;
    generating a plurality of first oscillator signals from a single reference clock signal
    generating a DSP clocking signal from the single reference clock signal
    and converting the plurality of radio signals from a first frequency band to a second frequency band using the plurality of first oscillator signals,
    generating a plurality of second oscillator signals from the single reference clock signal;
    adjusting the dispersion of at least one of the plurality of second oscillator signals; and
    converting the plurality of radio signals from the second frequency band to a third frequency band using the plurality of second oscillator signals.

12. The method of claim 11, comprising:
    adjusting the dispersion of at least one of the plurality of first oscillator signals.

13. The method of claim 11, using a digital signal processor to generate the signals in the first frequency band.

14. The method of claim 11, wherein the adjustment of the dispersion comprises at least one of adjusting the phase or the timing of at least one of the first oscillator signals.

15. The method of claim 11, wherein the adjustment of the dispersion comprises at least one of adjusting the phase or the timing of at least one of the second oscillator signals.

16. The method of claim 11, further comprising generating a plurality of feedback signals for adjusting at least one of the plurality of radio signals at an input.

17. A chip set comprising:
    a plurality of signal inputs for inputting radio signals at a third frequency band and being connected to the plurality of signal paths;
    a plurality of first mixers in the plurality of the signal paths for converting the frequency of the radio signals between the first frequency band and a second frequency band;
    a plurality of first local oscillators connected to the plurality of first mixers; and
       a plurality of second mixers connected to outputs of the plurality of first mixers in the plurality of signal paths and for converting the frequency of the radio signals between the second frequency band and the third frequency band;
       a plurality of second local oscillators being connected to different ones of the plurality of second mixers; and
    a single reference oscillator being connected to different ones of the plurality of local oscillators through a plurality of first oscillator signal paths, to different ones of the plurality of second local oscillators through a plurality of second oscillator signal paths, and to a digital signal processor.

18. A computer program product executable by a processor, the computer program product comprising a non-transitory computer-readable medium having control logic stored therein for causing a computer to manufacture an active antenna array for a mobile communications network comprising:
    a plurality of antenna elements for relaying radio signals at a first frequency band, the plurality of antenna elements being connected to a plurality of signal paths;
    a plurality of signal inputs for inputting radio signals at a third frequency band and being connected to the plurality of signal paths;
    a plurality of first mixers in the plurality of the signal paths for converting the frequency of the radio signals between the first frequency band and the second frequency band
    a plurality of first local oscillators connected to the plurality of first mixers; and a plurality of second mixers connected to outputs of the plurality of first mixers in the plurality of signal paths and for converting the frequency of the radio signals between the second frequency band and the third frequency band;

a plurality of second local oscillators being connected to different ones of the plurality of second mixers; and a single reference oscillator being connected to different ones of the plurality of local oscillators through a plurality of first oscillator signal paths, to different ones of the plurality of second local oscillators through a plurality of second oscillator signal paths, and to a digital signal processor.

19. A computer program product executable by a processor, the computer program product comprising a non-transitory computer-readable medium having control logic stored therein for causing an active antenna to execute a method for receiving a plurality of individual radio signals comprising:

first computer readable code means for inputting a plurality of radio signals at a first frequency band;

second computer readable code means for generating a plurality of first oscillator signals from a single reference clock signal third computer readable code means for adjusting the dispersion of at least one of the plurality of first oscillator signals; and fourth computer readable control means for converting the plurality of radio signals from a first frequency band to a second frequency band using the plurality of first oscillator signals, fifth computer readable control means for generating a plurality of second oscillator signals from the single reference clock signal;

sixth computer readable control means for adjusting the dispersion of at least one of the plurality of second oscillator signals; and seventh computer readable control means for converting the plurality of radio signals from the second frequency band to a third frequency band using the plurality of second oscillator signals.

* * * * *